United States Patent [19]
Ishikawa et al.
[11] 4,440,571
[45] Apr. 3, 1984

[54] PROCESS FOR THE SURFACE TREATMENT OF INORGANIC FIBERS FOR REINFORCING TITANIUM OR NICKEL AND PRODUCT

[75] Inventors: Toshikatsu Ishikawa, Tokyo; Junichi Tanaka, Yokohama; Haruo Teranishi, Machida; Tatsuya Okamura, Kobe; Tokuji Hayase, Chigasaki, all of Japan

[73] Assignee: Nippon Carbon Co., Ltd., Tokyo, Japan

[21] Appl. No.: 395,231

[22] Filed: Jul. 6, 1982

[30] Foreign Application Priority Data

Jul. 10, 1981 [JP] Japan ............................... 56-107721
Nov. 26, 1981 [JP] Japan ............................... 56-188338

[51] Int. Cl.³ ............................ B22F 1/00; B22F 3/00
[52] U.S. Cl. ...................................... 75/229; 428/549; 428/567; 428/569; 156/279; 427/191; 427/376.7; 427/404; 427/405; 427/419.1; 427/419.7; 427/434.6; 427/438; 204/192 N

[58] Field of Search ............... 427/191, 299, 304, 305, 427/370, 376.1, 376.6, 376.7, 383.3, 383.5, 404, 419.1, 419.7, 419.8, 430.1, 434.6, 431, 443.1, 438; 75/229; 428/568, 375, 386, 389, 367, 366, 549, 567, 569; 156/279; 204/192 N

[56] References Cited

U.S. PATENT DOCUMENTS

| | | | |
|---|---|---|---|
| 3,556,836 | 1/1971 | Basche et al. | 427/404 |
| 3,807,996 | 4/1974 | Sara | 75/229 |
| 3,889,348 | 6/1975 | Lemelson | 75/229 |
| 4,104,417 | 8/1978 | Sara | 427/404 |
| 4,157,409 | 6/1979 | Levitt et al. | 427/404 |
| 4,341,823 | 7/1982 | Sexton et al. | 427/305 |

*Primary Examiner*—Sadie L. Childs
*Attorney, Agent, or Firm*—Jordan and Hamburg

[57] ABSTRACT

A process for the surface treatment of inorganic fibers for reinforcing titanium or nickel, comprising the steps of coating the surface of inorganic fibers with an aqueous or organic solvent solution containing a titanate, borate, tetralkylammonium hydroxide and, if desired, dextrin and then heat treating the coated fibers at a high temperature in an inert or non-oxidizing atmosphere. In one embodiment, the heat treated inorganic fibers is further subjected to ionic or chemical plating with nickel.

6 Claims, No Drawings

PROCESS FOR THE SURFACE TREATMENT OF INORGANIC FIBERS FOR REINFORCING TITANIUM OR NICKEL AND PRODUCT

This invention relates to a process for the surface treatment of inorganic fibers for use in reinforcing titanium or nickel and more particularly to such a process whereby the interfacial reaction between inorganic fibers and titanium or nickel is minimized to effect a secure bond therebetween thus obtaining inorganic fiber-reinforced titanium or inorganic fiber-reinforced nickel.

A fiber-reinforced metal (FRM) has been given attention as being a material which is more resistant to high temperatures than a generally-used conventional fiber-reinforced plastic (FRP) and is contemplated to be used as a heat-resistant light-weight structural material; thus, every effort has been made to produce such a fiber-reinforced metal which may be put to practical use. Since particularly inorganic fiber-reinforced titanium or inorganic fiber-reinforced nickel is excellent in heat resistance, corrosion resistance and the like, they are expected to be used as materials for space, air craft, automobile and like industries.

However, these fiber-reinforced metals so far obtained may hardly be put to practical use although they are greatly expected to be done so. The cause for this is particularly an insufficient bond effected between the fibers and metal. Since, unlike plastics, metals have no bond strength such as a bond by means of hydrogen bond, a bond between a metal and fibers must be effected by means of diffusion, chemical reactions or mechanical pressing at a temperature elevated above a certain level. Various processes for producing fiber-reinforced metals have been proposed, however, they are all disadvantageous in that, for example, a high temperature is required, the interfacial reaction is remarkable, the operation is carried out with a low efficiency and cavities or voids are apt to be produced. In the production of a conventional inorganic fiber-reinforced titanium or nickel, the interfacial reaction between the inorganic fibers and titanium or nickel is very remarkable thereby making it almost impossible to put said conventional reinforced metal to practical use.

This invention has been made in an attempt to solve the aforesaid problems and the primary object thereof is to provide a process for effecting a secure bond between inorganic fibers and titanium or nickel by minimizing the interfacial reaction therebetween.

The said object may be achieved by subjecting inorganic fibers to specific surface treatments prior to compounding the inorganic fibers with titanium or nickel. More particularly, the process of this invention comprises coating inorganic fibers on the surface with a solution of a titanic acid ester (titanate), a boric acid ester (borate), a tetralkylammonium hydroxide and, as required, dextrin in water or an organic solvent, heat treating the thus coated inorganic fibers at a temperature of 1300°–1700° C. in an inert or non-oxidizing atmosphere to obtain inorganic fibers for reinforcing titanium or nickel, or comprises coating inorganic fibers on the surface with a solution of a titanate, a borate and a tetralkylammonium hydroxide in water or an organic solvent, heat treating the thus coated inorganic fibers at a temperature of 1300°–1500° C. in an inert or non-oxidizing atmosphere and then ionically or chemically plating the thus heat treated inorganic fibers with nickel to form a nickel film thereon thereby obtaining inorganic fibers for reinforcing titanium.

The inorganic fibers (hereinafter referred to simply as "fibers" for brevity) used in this invention are illustrated by carbon fibers including graphite fibers, alumina fibers, silicon carbide fibers, potassium titanate fibers, boron fibers and tungsten fibers, among which carbon fibers, boron fibers, alumina fibers and silicon carbide fibers are preferred from the view-point of the strength and the like of end products to be obtained.

In this invention, starting inorganic fibers are coated on the surface with an aqueous or organic solvent solution of a titanate [$Ti(OR)_4$ wherein R is an alkyl or aryl group], a borate [$B(OR')_n(OH)_{3-n}$ wherein R' is an alkyl group and n is an integer of 1–3] and a tetralkylammonium hydroxide (R''N—OH wherein R'' is an alkyl group) and then heat treated in an inert or non-oxidizing atmosphere.

The said aqueous or organic solvent solution may preferably contain, by weight, 1 part of a titanate, 1–5 parts of a borate, 0.1–0.9 parts of a tetralkylammonium hydroxide and 0.7–2.7 parts of water or an organic solvent.

Aqueous or organic solvent solutions having a composition outside the composition of the aforesaid solution according to this invention are inconvenient to coat inorganic fibers on the surface therewith since they are too viscous or else dilute and, in addition, they are undesirable since, for example, they will not produce titanium and boron compounds at the time of heat treatment thereof. The organic solvents used herein include methanol, xylene, acetone and petroleum ether.

The solution for coating according to this invention may preferably be prepared by adding 1 part by weight of a titanate and 1–5 parts by weight of a borate to 1–3 parts by weight of a 10–30 wt.% solution of a tetralkylammonium hydroxide in water or an organic solvent such as methanol and then mixing the whole together.

Inorganic fibers are immersed in, or passed through the thus prepared solution to form thereon an 0.05–3μ thick titanate-borate coating or film. The thus coated inorganic fibers, after being dried as required, are heat treated in an atmosphere of an inert or non-oxidizing gas such as argon, helium or nitrogen thereby to deposit on the whole surface of the fibers titanium and boron partly as the oxide thereof and partly as the compound thereof having a titanium/boron non-stoichiometric composition.

The heat treating temperature is in the range of 1300°–1700° C. in a case where the resulting surface treated fibers are used, without further treatment, for reinforcement of titanium or nickel.

The use of a heat treating temperature of lower than 1300° C. will result in the formation of a coating having an insufficient thickness on fibers, while the use of higher than 1700° C. will result in the degradation of the fibers. Thus, the fibers so heat treated will be unsuitable for reinforcing titanium or nickel therewith.

The heat treating time according to this invention may be in the range of as short as about 10–60 seconds.

In a case where the heat treated fibers are coated on the surface with nickel and used for reinforcing titanium, the heat treating temperature will be in the range of 1300°–1500° C. In this case, the use of a heat treating temperature of lower than 1300° C. will result in that the titanium and the boron compound are not satisfactory attached to each other, while the use of higher than 1500° C. will result in the disadvantageous degradation of the fibers at the time of forming a nickel film thereon. The heat treating time may be in the range of as short as about 10-60 seconds.

In a case where the fibers so coated and heat treated according to this invention are ionically or chemically plated with nickel to form a nickel film on the surface thereof, it is preferable that the resulting nickel film be formed to such a thickness that the overall or total thickness of the titanium/boron coating and nickel film amounts to 0.15–4μ. The ionic or chemical plating with nickel may be carried out under usual conditions. For example, the ionic plating may be carried out under a vacuum of $10^{-2}$–$10^{-3}$ Torr in an Ar or He atmosphere. The plating solution used in the chemical plating may be a commercially available one and is preferably a phosphorus-free plating solution.

The fibers treated in the above manner are then compounded with titanium to obtain a fiber-reinforced titanium having excellent strength.

The titanium and nickel attached to the fibers by said surface treatment form a titanium/nickel intermetallic compound ($Ti_2Ni$, Ti, Ni, $TiN_3$) at the interface thereby producing a ductile layer at the time of compounding the treated fibers with nickel.

Further, an ionic plating method (evaporation depositing method), impregnation method or immersion method may be used to form an aluminum film on the surface of fibers.

The impregnation method comprises immersing fibers in molten aluminum and pressurizing the fibers so immersed. In this method, the temperature of the molten aluminum may usually be 700°–750° C. and the pressure may usually be 50–100 $Kg/cm^2$. In a case where a film of a low melting metal is formed on the surface of fibers in the molten metal under a reduced pressure, the temperature of the molten metal is 700°–750° C. and the pressure is not higher than 1 Torr.

It is preferable that the aluminum film be 0.5–10μ in thickness. In a case where an aluminum film having such a thickness is formed, the aluminum and fibers will not produce a carbide. The film thickness is adjusted by varying the temperature of the molten metal and, in the case of the evaporation depositing method, it is adjusted by varying the amount of metal evaporation deposited. It is undesirable to form on fibers an aluminum film having a thickness of less than 0.5μ since the metal and fibers react with each other. It is also undesirable to form a film having a thickness of more than 10μ since the film (aluminum layer) is too much thereby lessening the strength of bond thereof to titanium or nickel.

According to one aspect of this invention in which an aluminum film is formed on the fibers, the treated fibers and titanium or nickel to be compounded therewith do not react with each other to form a carbide or silicon compound of the metal, and the aluminum film formed on the surface of the fibers and titanium or nickel to be compounded therewith will form an intermetallic compound such as TiXAlY, or NiMAlN wherein X, Y, M and N are each an integer of 1–3, at the time of compounding the fibers with the metal thereby to effect a secure bond between the fibers and the metal.

The nickel or titanium with which the treated fibers according to this invention are to be compounded to form a fiber-reinforced metal (FRM), is preferably in the form of a foil (50–100μ thick) or particles (particle size of 40μ or finer). The treated fibers and the foil-like or particulate metal may be molded preferably at a heating temperature of 800°–1000° C. and a pressure of 100–1000 $Kg/cm^2$ for 0.5–6 hours.

This invention will be better understood by the following examples and comparative examples wherein all the parts are by weight unless otherwise specified.

EXAMPLE 1

One part of tetraisopropyl titanate $[(CH_3)_2CH]_4TiO_4$ and 3 parts of isopropyl borate $B[OCH(CH_3)_2]_3$ were added to 2 parts of a 20 wt.% solution of tetramethylammonium hydroxide in methanol and mixed together to prepare a treating solution.

Silicon carbide fibers (produced under the trade name of Nikalon 500 filaments, dia. of fibers 15μ, by Nippon Carbon Co., Ltd.) were immersed in the thus prepared treating solution to coat the surface of the fibers therewith, dried at 200° C. for 30 seconds in air and then heat treated at 1400° C. for 15 seconds in a nitrogen atmosphere to form on the fibers a coating or film according to this invention. The thus formed coating was measured by an X-ray microanalyzer with the result that boron and titanium were confirmed to be present in the coating.

EXAMPLE 2

Carbon fibers (produced under the trade name of Carboron Z, 3000 filaments, dia. of fibers 7μ by Nippon Carbon Co., Ltd.) were immersed in the same treating solution as used in Example 1 to coat the surface of the fibers therewith, dried at 150° C. for 40 seconds in air and then heat treated at 1600° C. for 20 seconds in a nitrogen atmosphere to form a coating according to this invention on the fibers. The thus formed coating was measured by the same method as in Example 1 to find the presence of boron and titanium therein.

EXAMPLE 3

One part of tetrabutyl titanate $Ti(OC_4H_9)_4$ and 2 parts of triethyl borate $B(OCH_2CH_3)_3$ were added to 3 parts of a 30 wt.% solution of tetramethylammonium hydroxide in ethanol, mixed together and then incorporated with 0.2 parts of dextrin to prepare a treating solution.

Alumina fibers (200 filaments, dia. of fibers 20μ) were immersed in the thus prepared treating solution to coat the surface of the fibers therewith, after which the coated fibers were dried at 180° C. for 40 seconds and then heat treated at 1500° C. for 50 seconds to form a coating or film on the fibers.

The coating so formed was measured by the same method as used in Example 1 with the result that boron and titanium were confirmed to be present in the coating.

EXAMPLES 4–9

The fibers with a coating according to this invention formed thereon obtained in each of Examples 1–3, were compounded with nickel or titanium by the following method to obtain a fiber-reinforced nickel or titanium. The properties of the thus obtained fiber-reinforced metal are as shown in Table 1.

(1) Method of compounding with nickel

The treated fibers were arranged parallel to one another, chemically plated with nickel to form a nickel coat on the fibers (the thickness of the nickel coat being 3μ for the silicon carbide fibers, 2μ for the carbon fibers and 5μ for the alumina fibers), piled one upon another using a polystyrene resin as the binder and then maintained at 800° C. and a molding pressure of 500 Kg/cm$^2$ for one hour by the use of a hot press to obtain a laminated or compounded product.

(2) Method of compounding with titanium

Titanium particles (325 mesh or finer) were dispersed in a solution of polystyrene to prepare a dispersion of titanium particles. The treated fibers were immersed in the thus prepared dispersion to attach the titanium particles to the fibers, arranged parallel to one another, piled one upon another and maintained at a temperature of 850° C. and a molding pressure of 700 Kg/cm$^2$ for 40 minutes by the use of a hot press to obtain a laminated or compounded product.

COMPARATIVE EXAMPLES 1–6

The same starting silicon carbide fibers, carbon fibers and alumina fibers (without any surface coating or coatings) as used in Examples 1–3, were compounded with nickel or titanium in the same manner as in Examples 4–9 to obtain laminated or compounded products, respectively. The properties of the thus obtained products are as shown in Table 1.

TABLE 1

| | Tensile strength Fibers | compounded | Fiber Metal (%) | voluminal ratio (Kg/mm$^2$) |
|---|---|---|---|---|
| Example | | | | |
| | SiC | Ni | 20 | 86 |
| 5 | Carbon | Ni | 20 | 96 |
| 6 | Alumina | Ni | 20 | 76 |
| 7 | SiC | Ti | 20 | 90 |
| | Carbon | Ti | 20 | 100 |
| 9 | Alumina | Ti | 30 | 80 |
| Comparative Example | | | | |
| 1 | SiC | Ni | 20 | 40 |
| 2 | Carbon | Ni | 20 | 35 |
| 3 | Alumina | Ni | 20 | 40 |
| 4 | SiC | Ti | 20 | 45 |
| 5 | Carbon | Ti | 20 | 40 |
| 6 | Alumina | Ti | 30 | 45 |

COMPARATIVE EXAMPLES 7–8

The same starting silicon carbide fibers as used in Example 1 were immersed in the same treating solution as used in Example 1 to coat the surface of the fibers therewith, dried at 200° C. for 30 seconds and then heat treated in a nitrogen atmosphere at such a temperature and for such a time as shown in Table 2 to form a coating on the fibers. The thus coated fibers were compounded with nickel in the same manner as in Example 4 to obtain a fiber-reinforced nickel. The results are as indicated in Table 2.

TABLE 2

| | Heat | | Fiber treatment | voluminal | Tensile |
|---|---|---|---|---|---|
| | Temp. (°C.) | Time (sec.) | ratio (%) | strength (Kg/mm$^2$) | State of fracture |
| Comparative Example | | | | | |
| 7 | 1200 | 50 | 25 | 69 | Interfacial reaction found. |
| 8 | 1750 | 20 | 25 | 56 | Fibers had uneven surface although no interfacial reaction found. |

As is seen from the above, the process of this invention is a comparatively simplified one which will exhibit excellent effects and is very industrially useful.

EXAMPLE 10

The same heat treated fibers with a coating formed thereon as obtained in Example 1 were then chemically plated with nickel (using a commercially available Ni plating solution at 20° C. for 5 minutes) to form an 0.5μ thick nickel coating on the fibers. The overall or total thickness of the coatings formed on the fibers amounts to 3μ. These coatings were measured by an X-ray microanalyzer with the result that boron, titanium and nickel were confirmed to be present in said coatings.

The heat treated silicon carbide fibers were immersed in a polystyrene resin solution containing titanium particles (325 mesh or finer) dispersed therein to attach the titanium particles to the fibers. The particles-attached fibers were arranged parallel to one another, piled one upon another and then maintained at a temperature of 850° C. and a molding pressure of 600 Kg/cm$^2$ for 40 minutes by the use of a hot press to obtain a silicon carbide fiber-reinforced titanium having the properties shown in Table 3.

EXAMPLE 11

One part of tetrabutyl titanate $Ti(OC_4H_9)_4$ and 2 parts of triethyl borate $B(OCH_2CH_3)_3$ were added to 3 parts of a 30 wt.% of tetramethylammonium hydroxide in ethanol and mixed together to prepare a treating solution.

Carbon fibers (produced under the trade name of Carbolon Z, 300 filaments, dia. of fibers 7μ, by Nippon Carbon Co., Ltd.) were immersed in the thus prepared treating solution to coat the surface of the fibers therewith, dried at 150° C. for 40 seconds in air and then heat treated at 1350° C. for 30 seconds in a nitrogen atmosphere. The thus heat treated fibers were chemically plated with nickel in the same manner as in Example 10 to form a nickel coating thereon. The overall or total thickness of the coatings formed on the thus plated fibers amounts to 2.5μ. These coatings were measured by an X-ray microanalyzer with the result that boron, titanium and nickel were present in the coatings.

The nickel plated carbon fibers were compounded with titanium in the same manner as in Example 10 to obtain a carbon fiber-reinforced titanium having the properties shown in Table 3.

EXAMPLE 12

Alumina fibers (200 filaments, dia. of fibers 20μ) were immersed in the same treating solution as used in Example 10 to coat the surface of the fibers therewith, dried at 180° C. for 40 seconds and then heat treated at 1500° C. for 50 seconds in a helium atmosphere. Further, the thus heat treated fibers were ionically plated ($10^{-3}$ Torr, 30 minutes) with nickel to form a nickel coating thereon. The total thickness of the coatings amounts to 1μ. These coatings were measured by an X-ray microanalyzer with the result that boron, titanium and nickel were confirmed to be present in the coatings.

The nickel plated alumina fibers were compounded with titanium in the same manner as in Example 10 to obtain an alumina fiber-reinforced titanium having the properties shown in Table 3.

COMPARATIVE EXAMPLES 9-11

The same starting silicon carbide fibers, carbon fibers and alumina fibers (no coating formed and no surface treatment effected) as used in Examples 10-12 were compounded with titanium in the same manner as in Example 10 to obtain fiber-reinforced titanium composites, respectively. The properties of these composites are as shown in Table 3.

TABLE 3

| Example and Comparative Example | Fiber | Fiber voluminal ratio (%) | Tensile strength ($Kq/mm^2$) |
|---|---|---|---|
| Example 10 | SiC fibers | 25 | 110 |
| Comparative Example 9 | SiC fibers | 25 | 50 |
| Example 11 | Carbon fibers | 25 | 115 |
| Comparative Example 10 | Carbon fibers | 25 | 50 |
| Example 12 | Alumina fibers | 30 | 85 |
| Comparative Example 11 | Alumina fibers | 30 | 45 |

COMPARATIVE EXAMPLES 12-13

The same starting silicon carbide fibers as used in Example 10 were immersed in the same treating solution as used in Example 10 to coat the surface of the fibers therewith, dried at 200° C. for 30 seconds in air and then heat treated at the temperatures shown in Table 4 in a nitrogen atmosphere. The thus heat treated fibers were plated with nickel in the same manner as in Example 10 to form a nickel coating on the fibers.

The total thickness of the coatings (composed of titanium, boron and nickel) formed on the silicon carbide fibers is indicated in Table 4.

TABLE 4

| | Heat treating temperature (°C.) | Total thickness of coatings (μ) | Fiber voluminal ratio (%) | Tensile strength ($Kg/mm^2$) | State of fracture |
|---|---|---|---|---|---|
| Comparative Example 12 | 1200 | 3 | 25 | 60 | Interfacial reaction found. |
| Comparative Example 13 | 1550 | 2 | 25 | 60 | No interfacial facial reaction found, but fibers had uneven surface. |

As is seen from the foregoing, the effects or advantages obtained by this invention are as follows.

(1) The inorganic fibers surface treated according to this invention will only cause a minimum interfacial reaction with titanium to be compounded therewith thereby obtaining a satisfactory compounded product.

(2) The surface treating process of this invention comprises coating the inorganic fibers with a specified treating solution, heat treating the coated fibers at a comparatively low temperature for a short time and, as required, further forming a nickel coating on the heat treated fibers. Thus, the present process may be easily carried out by the use of a simplified apparatus without requiring complicated operations.

(3) The process of this invention is effective in making ductile the boron present in the surface layer of the fibers and does not weaken the fibers although titanium is apt to react with inorganic fibers at the time of compounding them with each other thereby tending to cause the surface of the fibers to be roughened.

(4) The titanium and nickel which come to be present in the surface layer of the fibers due to the surface treatment thereof according to this invention will produce a titanium/nickel intermetallic compound ($Ti_2Ni$, Ti, Ni, $TiN_3$) at the interface at the time of compounding the fibers with nickel thereby to form a ductile layer.

The inorganic fiber-reinforced titanium and nickel obtained by the process of this invention may preferably be used as material for space craft, aircraft and automobile industries since they are excellent in strength and heat resistance.

What is claimed is:

1. A process for the surface treatment of inorganic fibers for reinforcing titanium or nickel, comprising the steps of:

coating the surface of inorganic fibers selected from the group consisting of carbon fibers, alumina fibers, silicon carbide fibers, potassium titanate fibers, boron fibers and tungsten fibers, with an aqueous or organic solvent solution containing, in parts by weight, 1 part of a titanate, 1-5 parts of a borate, 0.1-0.9 parts of a tetraalkylammonium hydroxide and 0.7-2.7 parts of water or an organic solvent and then heat treating the thus coated inorganic fibers at 1300°-1700° C. in an inert or non-oxidizing atmosphere to obtain surface treated inorganic fibers for reinforcing titanium or nickel.

2. A process according to claim 1, wherein the aqueous or organic solvent solution further contains dextrin in an amount of 0.5-7% by weight thereof.

3. A process for the surface treatment of inorganic fibers for reinforcing titanium, comprising the steps of:

coating the surface of inorganic fibers selected from the group consisting of carbon fibers, alumina fibers, silicon carbide fibers, potassium titanate fibers, boron fibers and tungsten fibers, with an aqueous or organic solvent solution containing, in parts by weight, 1 part of a titanate, 1-5 parts of a borate, 0.1-0.9 parts of a tetraalkylammonium hydroxide and 0.7-2.7 parts of water or an organic solvent, heat treating the thus coated inorganic fibers at 1300°1500° C., in an inert or non-oxidizing atmosphere, and then ionically or chemically plating the thus heat treated inorganic fibers with nickel to form a nickel coating thereon thereby to obtain a surface treated inorganic fibers for reinforcing titanium.

4. A process according to claim 3, wherein the inorganic fibers are carbon fibers, boron fibers, alumina fibers or silicon carbide fibers.

5. Inorganic fiber-reinforced titanium or nickel produced by applying titanium or nickel in the foil or particulate form to the surface treated inorganic fibers obtained by the process of claim 2, 4 or 1 and then molding the whole at a temperature of 800°-1000° C. and a molding pressure of 100-1000 $Kg/cm^2$ for 0.5-6 hours to compound the metal and the fibers with each other thereby obtaining the inorganic fiber-reinforced titanium or nickel.

6. Inorganic fiber-reinforced titanium or nickel produced by applying titanium in the foil or particulate form to the surface treated inorganic fibers obtained by the process of claim 3 and then molding the whole at a temperature of 800°-1000° C. and a molding pressure of 100-1000 $Kg/cm^2$ for 0.5-6 hours to compound the metal and the fibers with each other thereby obtaining the inorganic fiber-reinforced titanium or nickel.

* * * * *